(12) United States Patent
Prud'homme et al.

(10) Patent No.: US 9,649,822 B2
(45) Date of Patent: May 16, 2017

(54) FLEXIBLE CELLULOSIC FIBER-BASED HONEYCOMB MATERIAL

(75) Inventors: Hugues Prud'homme, Saint-Thomas (CA); Diego De Paoli, Woodbridge (CA); Michael Kumar, Ajax (CA); Marc Brassard, Milton (CA); David James, Blackstock (CA)

(73) Assignee: CASCADES CANADA ULC, Kingsey Falls, Quebec (CA)

( * ) Notice: Subject to any disclaimer, the term of this patent is extended or adjusted under 35 U.S.C. 154(b) by 970 days.

(21) Appl. No.: 13/518,536

(22) PCT Filed: Dec. 22, 2010

(86) PCT No.: PCT/CA2010/002015
§ 371 (c)(1),
(2), (4) Date: Jun. 22, 2012

(87) PCT Pub. No.: WO2011/075830
PCT Pub. Date: Jun. 30, 2011

(65) Prior Publication Data
US 2012/0266568 A1    Oct. 25, 2012

Related U.S. Application Data

(60) Provisional application No. 61/288,922, filed on Dec. 22, 2009.

(51) Int. Cl.
*B32B 3/12* (2006.01)
*B32B 21/02* (2006.01)
(Continued)

(52) U.S. Cl.
CPC ............... *B32B 3/12* (2013.01); *B32B 21/02* (2013.01); *B32B 23/02* (2013.01); *B32B 29/00* (2013.01);
(Continued)

(58) Field of Classification Search
None
See application file for complete search history.

(56) References Cited

U.S. PATENT DOCUMENTS

| 1,002,132 A | 8/1911 | Brown | |
|---|---|---|---|
| 2,006,224 A * | 6/1935 | Weber et al. | 206/326 |

(Continued)

FOREIGN PATENT DOCUMENTS

| CA | 2659916 | 9/2009 |
|---|---|---|
| JP | 2003-072848 | 3/2003 |

(Continued)

OTHER PUBLICATIONS

International Search Report of PCT/CA2010/002015 mailed Mar. 16, 2011.

*Primary Examiner* — David Sample
*Assistant Examiner* — Nicholas W Jordan
(74) *Attorney, Agent, or Firm* — Eversheds Sutherland (US) LLP

(57) ABSTRACT

A flexible cellulosic fiber-based material including: a core portion having a geometrically patterned structure defining two spaced-apart substantially planar faces and providing air space therebetween, the core portion including cellulosic fiber-based walls having a core grammage; and at least one cellulosic fiber-based liner bonded to a respective one of the planar faces of the core portion and having a liner grammage lower than the core grammage, the material being flexible along a plane defined by the at least one liner.

20 Claims, 4 Drawing Sheets

(51) Int. Cl.
   *B32B 23/02*   (2006.01)
   *B32B 29/00*   (2006.01)
   *B32B 37/12*   (2006.01)
   *B32B 37/14*   (2006.01)
   *B65B 55/20*   (2006.01)

(52) U.S. Cl.
   CPC ............ *B32B 37/12* (2013.01); *B32B 37/146* (2013.01); *B32B 2305/024* (2013.01); *B32B 2307/21* (2013.01); *B32B 2307/546* (2013.01); *B32B 2307/718* (2013.01); *B32B 2317/10* (2013.01); *B32B 2317/12* (2013.01); *B32B 2317/125* (2013.01); *B32B 2553/00* (2013.01); *B65B 55/20* (2013.01); *Y10T 156/10* (2015.01); *Y10T 428/1303* (2015.01); *Y10T 428/24149* (2015.01); *Y10T 428/24165* (2015.01); *Y10T 428/24942* (2015.01)

(56) References Cited

U.S. PATENT DOCUMENTS

| | | | |
|---|---|---|---|
| 2,761,553 A | 9/1956 | Wheeler | |
| 3,227,600 A | 1/1966 | Holland | |
| 3,413,177 A | 11/1968 | Hoyt | |
| 3,587,479 A | 6/1971 | Geschwender | |
| 3,655,478 A | 4/1972 | Geschwender | |
| 3,982,057 A | 9/1976 | Briggs et al. | |
| 4,286,006 A * | 8/1981 | Boelter | 428/182 |
| 4,382,106 A | 5/1983 | Royster | |
| 4,461,796 A | 7/1984 | Fukahori et al. | |
| 5,000,372 A | 3/1991 | Hollander et al. | |
| 5,030,501 A | 7/1991 | Colvin et al. | |
| 5,518,802 A | 5/1996 | Colvin et al. | |
| 5,538,775 A * | 7/1996 | Kawakami | B32B 3/28 428/118 |
| 5,540,972 A | 7/1996 | Jaegers et al. | |
| 5,544,473 A | 8/1996 | Maida et al. | |
| 5,667,871 A | 9/1997 | Goodrich et al. | |
| 5,688,578 A | 11/1997 | Goodrich | |
| 5,733,403 A * | 3/1998 | Morley | B31D 3/005 156/194 |
| 5,741,098 A | 4/1998 | Letts, III | |
| 5,782,735 A | 7/1998 | Goodrich et al. | |
| 5,804,030 A | 9/1998 | Jaegers et al. | |
| 5,894,044 A | 4/1999 | Norcom et al. | |
| 5,950,835 A * | 9/1999 | Moser et al. | 206/586 |
| 6,007,469 A | 12/1999 | Jaegers | |
| 6,007,470 A | 12/1999 | Komarek et al. | |
| 6,033,167 A | 3/2000 | Bourgeois | |
| 6,372,322 B1 * | 4/2002 | Devaguptapu | 428/116 |
| 6,436,511 B1 | 8/2002 | Ratzel | |
| 6,468,646 B2 | 10/2002 | Carson et al. | |
| 6,596,124 B2 | 7/2003 | Hookham et al. | |
| 6,753,061 B1 * | 6/2004 | Wedi | 428/73 |
| 6,871,480 B1 | 3/2005 | Goodrich | |
| 6,887,554 B2 | 5/2005 | Widlund et al. | |
| 7,288,164 B2 | 10/2007 | Roberge et al. | |
| 7,452,316 B2 | 11/2008 | Cals et al. | |
| 2002/0025404 A1 | 2/2002 | Taber et al. | |
| 2009/0081416 A1 | 3/2009 | Goodrich | |
| 2010/0078985 A1* | 4/2010 | Mahoney et al. | 428/73 |
| 2011/0217345 A1 | 9/2011 | Huang et al. | |

FOREIGN PATENT DOCUMENTS

| | | |
|---|---|---|
| WO | 98/28205 A1 | 7/1998 |
| WO | 9828205 A1 | 7/1998 |
| WO | 00/06374 A1 | 2/2000 |
| WO | 01/26889 A1 | 4/2001 |
| WO | 01/94236 A1 | 12/2001 |
| WO | 2008/037078 A1 | 4/2008 |
| WO | 2009/045095 A1 | 4/2009 |
| WO | WO 2009157786 A1 * | 12/2009 |

* cited by examiner

FLEXIBLE CELLULOSIC FIBER-BASED HONEYCOMB MATERIAL

CROSS-REFERENCE TO RELATED APPLICATIONS

This application claims priority under 35 USC§119 (e) of U.S. provisional patent application 61/288,922 filed on Dec. 22, 2009, the specification of which is hereby incorporated by reference. This application is a national phase entry of PCT patent application Ser. No. PCT/CA2010/002015 filed on Dec. 22, 2010 (now pending), designating the United States of America.

TECHNICAL FIELD OF THE INVENTION

The present invention relates to a flexible material for packaging, structural, and void space filling applications, for instance, and, more particularly, to a flexible cellulosic fiber-based material including a three-dimensional geometrically patterned structure such as a honeycomb structure.

BACKGROUND

Bubble wrap® and similar products are pliable plastic material commonly used for packing fragile items and filling void spaces. They include regularly spaced, protruding air-filled hemispheres ("bubbles") which provide cushioning for packaged items.

Packaging and void space filling materials should be relatively lightweight, flexible to adapt to almost any shapes and sizes, easy to use, and relatively reliable.

However, Bubble wrap® and similar products are made of plastics, which are usually not environmentally friendly since most of them are not recyclable or biodegradable.

Furthermore, the structural properties of Bubble wrap® and similar products are limited.

There is thus a need for new materials which are more environmentally friendly that can be used for packaging, structural, and void space filling applications, for instance.

BRIEF SUMMARY OF THE INVENTION

It is therefore an aim of the present invention to address the above mentioned issues.

According to an aspect, there is provided a cellulosic fiber-based packaging material comprising: a core portion having a geometrically patterned structure defining two spaced-apart substantially planar faces and providing air space therebetween, the core portion including a cellulosic fiber-based material having a core grammage; and at least one liner bonded to a respective one of the planar faces of the core portion and including a cellulosic fiber-based material having a liner grammage lower than the core grammage, the packaging material being flexible along a plane defined by the at least one liner.

According to another aspect, there is provided a flexible paper honeycomb structure comprising: a core portion having a paper-based honeycomb structure defining two spaced-apart substantially planar faces and providing air space therebetween and including paper-based walls having a grammage between 60 and 200 grams per square meter; and two paper-based liners bonded to a respective one of the planar faces of the core portion and having a grammage below 60 grams per square meter.

According to another aspect, there is provided a flexible cellulosic fiber-based material comprising: a core portion having a geometrically patterned structure defining two spaced-apart substantially planar faces and providing air space therebetween, the core portion including cellulosic fiber-based walls having a core grammage; and at least one cellulosic fiber-based liner bonded to a respective one of the planar faces of the core portion and having a liner grammage lower than the core grammage, the material being flexible along a plane defined by the at least one liner.

In an embodiment, the geometrically patterned structure comprises a plurality of cells having a diameter and a height, and the ratio of the cell height and the cell diameter is below 1.1. In an embodiment, the core grammage ranges between 80 and 200 grams per square meter and the liner grammage is below 100 grams per square meter. In an embodiment, the cellulosic fiber grammage of the liner is below 60 grams per square meter. In an embodiment, the geometrically patterned structure of the core portion is in one of an at least partially expanded state and a stretched state.

The material can be rollable onto itself in a spiral shape.

According to another aspect, there is provided a packaging material comprising the flexible cellulosic fiber-based material described above.

According to still another aspect, there is provided a roll of the flexible cellulosic fiber-based material as described above, wherein the flexible cellulosic fiber-based material is rolled onto itself into a spiral shape.

According to a further aspect, there is provided a method for packing an article comprising: applying the flexible cellulosic fiber-based material described above over the article to at least partially cover the article; and folding the flexible cellulosic fiber-based material over at least one non-planar element of the article.

According to still another aspect, there is provided a flexible cellulosic fiber-based material comprising: a core portion having a three dimensional geometrically patterned structure with cellulosic fiber-based walls having a grammage between 80 and 200 grams per square meter, the three dimensional geometrically patterned structure defining two spaced-apart substantially planar faces and providing air space therebetween; and at least one cellulosic fiber-based liner bonded to a respective one of the planar faces of the core portion and having a grammage below 100 grams per square meter.

According to another aspect, there is provided a method for manufacturing a flexible cellulosic fiber-based material, comprising: providing a core portion having a geometrically patterned structure defining two spaced-apart substantially planar faces and a plurality of cells having a diameter and a height and providing air space therebetween, the core portion including a cellulosic fiber-based material having a core grammage and having a cell height and diameter ratio below 1.1; and bonding at least one liner to a respective one of the planar faces of the core portion, the at least one liner including a cellulosic fiber-based material having a liner grammage, the core grammage and the liner grammage being selected to obtain a lower liner grammage than the core grammage, the packaging material being flexible along a plane defined by the at least one liner.

Although the higher weights are normally denoted as paperboard or linerboard, the term 'paper' includes paper of all types, paperboard, linerboard, coated paper, printed paper, tissue paper, air-laid tissue paper, and the like having a grammage ranging between 10 to 500 grams per square meter.

BRIEF DESCRIPTION OF THE DRAWINGS

It will be noted that throughout the appended drawings, like features are identified by like reference numerals.

DETAILED DESCRIPTION

Figure 1:
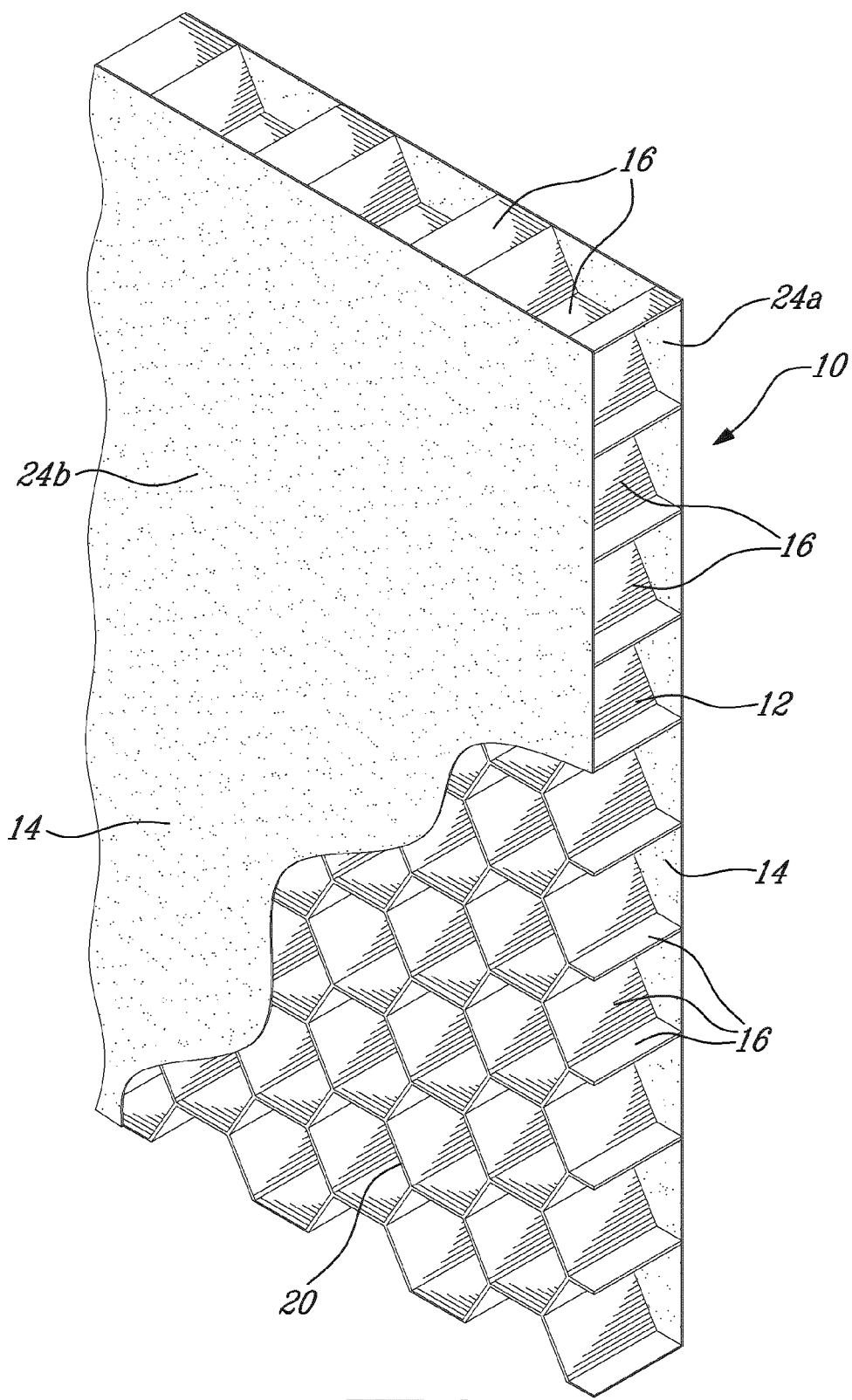
FIG. 1 is a perspective view, partly sectioned, of a flexible paper honeycomb material in accordance with an embodiment.

Referring now to the drawings and, more particularly referring to FIG. 1, it will be seen a flexible and protective cellulosic fiber based material 10 including a three-dimensional geometrically patterned structure in accordance with an embodiment. More particularly, in the embodiment shown, the three-dimensional geometrical pattern is a honeycomb structure.

The material 10 includes a core portion 12 and two face members, or liners, 14. The core portion 12 has walls 16 defining the three-dimensional geometrically patterned structure which provides air spaces therein and strengthens the resulting material 10. In the embodiment shown, the geometrically patterned structure is a honeycomb type structure with hexagonal open-ended core cells. The walls 16 of the core portion 12 define two opposite substantially planar surfaces 20, spaced-apart from one another.

In the embodiment shown, the honeycomb type material is a grid of hexagonal cells. As it will be easily understood by one skilled in the art, any other lattice structure and/or geometrically patterned structure, which provides enhanced strength for supporting and protecting loads, creating an air space as a result of that structure, can be used.

The walls 16 of the core portion 12 can be made of any cellulosic fiber-based materials such as, without being limitative, wood fibers, agricultural residues, and recycled fibers, or any combination thereof. For instance and without being limitative, the walls 16 of the core portion 12 can be made of virgin kraft paper or recycled paper (or medium). The wall material can be unbleached (brown) or bleached and is adapted for packaging applications.

In an embodiment, the wall material has a grammage ranging between 60 and 200 grams per square meter. In an alternative embodiment, the wall material has a grammage ranging between about 65 and about 130 grams per square meter and, in still another embodiment, the wall material has a grammage ranging between about 80 and about 110 grams per square meter.

The core portion 12 may be manufactured by applying spaced apart, parallel glue strips across each of a plurality of sheets of cellulosic fiber-based material. The glue strips on alternate sheets being off-set with respect to the glue strips on the intermediate sheets, superimposing aligned sheets upon another to form a stack, and thereafter expanding the said edge portion to form the core.

In an embodiment, the cell dimensions range between about 0.6 cm (¼ inch) and 3.8 cm (1½ inch), i.e. each cell has a diameter of about 0.6 cm up to 3.8 cm. In an alternative embodiment, the cell diameter ranges between about 1.6 cm (⅝ inch) and 2.2 cm (⅞ inch). In another alternative embodiment, the cell diameter ranges between about 0.95 cm (⅜ inch) and 1.6 cm (⅝ inch) and, in still another alternative embodiment, the cell diameter ranges between about 0.95 cm (⅜ inch) and 2.2 cm (⅞ inch). The diameter of a cell is measured between two opposed cell walls.

In an embodiment, the core height, i.e. the wall height, ranges between about 0.6 cm (¼ inch) and 1.9 cm (¾ inch). In an alternative embodiment, the cell height ranges between about 0.95 cm (⅜ inch) and 1.3 cm (½ inch).

In an embodiment, the ratio of the cell height and the cell diameter is below about 1.1. In an alternative embodiment, the ratio is kept below or equal to about 1 for a greater flexibility of the resulting material.

In an embodiment, the honeycomb structure or any other three-dimensional geometrically patterned structure can be in a stretched state to improve the flexibility of the resulting material, i.e. the three-dimensional geometrically patterned structure is stretched. In other words, the core portion can be stretched along an axis in a manner such that the cell diameter is longer along the stretch axis and shorter along an axis substantially perpendicular to the stretch axis. The cells are thus flattened along the axis that is substantially perpendicular to the stretch axis. If the cells are stretched, the cell diameter is measured between the two most-spaced apart corners, i.e. along the stretch axis.

The walls of the core portion can be prestressed, i.e. they can be deformed along their length to a predetermined depth. The deformation can be achieved by compressing the core portion, including or not a face member, to a predetermined depth.

The face members 14, or liners, are also cellulosic fiber-based materials such as, without being limitative, wood fibers, agricultural residues, and recycled fibers, or any combination thereof. For instance and without being limitative, the liners 14 can be made of tissue paper, towel paper, extendable kraft paper, recycled paper (medium), and kraft paper. The liners can include additives, coatings, adhesives, or resins to modify its properties. For instance and without being limitative, the liners can be air-laid papers including cellulosic fibers and resins or antistatic paper-based materials. One skilled in the art will appreciate that liners including additives, coatings, adhesives, or resins have higher grammages than liners that are substantially free of additives, coatings, adhesives, and resins. As for the wall material, the liners 14 can be unbleached (brown) or bleached and are adapted for packaging structural, and void space filling applications. The liners are substantially flat, relatively thin, and flexible members.

The face members 14 and/or the walls of the core portion 12 can be single ply or can comprise several superposed paper plies. In an embodiment, at least one of face members 14 is a tissue paper. The face members 14 can be embossed, i.e. they can include an embossed pattern. They can further have information, patterns, ornamentations, and the like printed thereon.

In an embodiment, the liners 14 have a grammage ranging below about 100 grams per square meter. The liner grammage includes the cellulosic fiber grammage and the additive, coating, adhesive, or resin grammage. In an embodiment, the liners 14 have a cellulosic fiber grammage below about 60 grams per square meter. In an alternative embodiment, the cellulosic fiber grammage ranges between about 10 and 50 grams per square meter. In still another embodiment, the liners 14 have a cellulosic fiber grammage ranging between about 20 and 30 grams per square meter. In a further embodiment, the liners 14 have a cellulosic fiber grammage ranging between about 30 and 50 grams per square meter.

The grammage of the liner(s) 14 is typically lower than the grammage of the walls defining the core portion.

As mentioned above, when a liner includes an additive, a coating, an adhesive or a resin, the total grammage of the liner, i.e. the grammage of the liner including the cellulosic fiber grammage and the resin, coating, adhesive, or additive grammage, is below about 100 grams per square meter. In an alternative embodiment, the total grammage of the liner is below about 80 grams per square meter.

In an embodiment, if one of the liners includes an additive, a coating, an adhesive or a resin, the other liner is substantially free of resin, coating, adhesive, or additive such as a cohesive adhesive, a pressure sensitive adhesive, an airlaid coating, or any other coating. In an embodiment, if one of the liners includes an additive, a coating, an adhesive or a resin, the other liner has a total grammage below about 60 grams per square meter.

In an embodiment, the total grammage of both liners is below about 160 grams per square meter. In an alternative embodiment, the total grammage of both liners is below about 120 grams per square meter.

Each one of the liners 14 has two surfaces 24a, 24b. One surface 24a of each liner 14, the inner surface, is laminated (or bonded) on a respective surface 20 of the core portion 12. The other surface 24b of each face member 14 is the outer surface of the material 10. The liners 14 are bonded to the core portion 12 with the three-dimensional geometrically patterned structure in an at least partially expanded state, i.e. with open-ended cells. The liners 14 maintain the three-dimensional geometrically patterned structure in the at least partially expanded state.

One skilled in the art will appreciate that the liners 14 maintain the three-dimensional geometrically patterned structure in an open-ended state which can be a partially expanded state, a fully expanded state or a stretched state.

It is appreciated that, in an alternative embodiment (not shown), the material 10 can include only one liner 14 bonded to one surface 20 of the core portion 12. Furthermore, if the material 10 includes two liners 14, the properties, for instance, the material and/or the grammage of both liners 14 can be different.

The material 10 has an overall thickness, i.e. including the core portion 12 and the liner(s) 14, ranging between about 0.6 and 2.5 cm (about 0.25 to 1 inch). In an alternative embodiment, the overall thickness ranges between about 0.6 and 1.6 cm (about 0.25 to 5/8 inch).

In an embodiment, the grammage of the material 10 is below about 500 grams per square meters. In an alternative embodiment, the grammage of the material is below about 400 grams per square meter.

The liners 14 can be continuous or discontinuous, i.e. several liners are juxtaposed and bonded to the surfaces 20 of the core portion 12. Moreover, the liners 14 can include apertures, elongated slots, and the like defined therein.

An additional layer can be superposed to the liners 14. For instance and without being limitative, a soft material can be superposed to the at least one of the liners 14 to improve the softness of the resulting material 10.

The face members 14 strengthen the honeycomb core portion 12 by being disposed perpendicular to the latter, thereby distributing the weight over the three-dimensional geometrically patterned structure such as the honeycomb structure. Bonding of the face members 14 on the core portion 12 can be accomplished by appropriate methods such as by gluing.

One skilled in the art will appreciate that the liners 14 can be bonded directly or indirectly to the surfaces 20 of the core portion 12. If the liners 14 are mounted indirectly, another material can be interposed in between.

Figure 2:
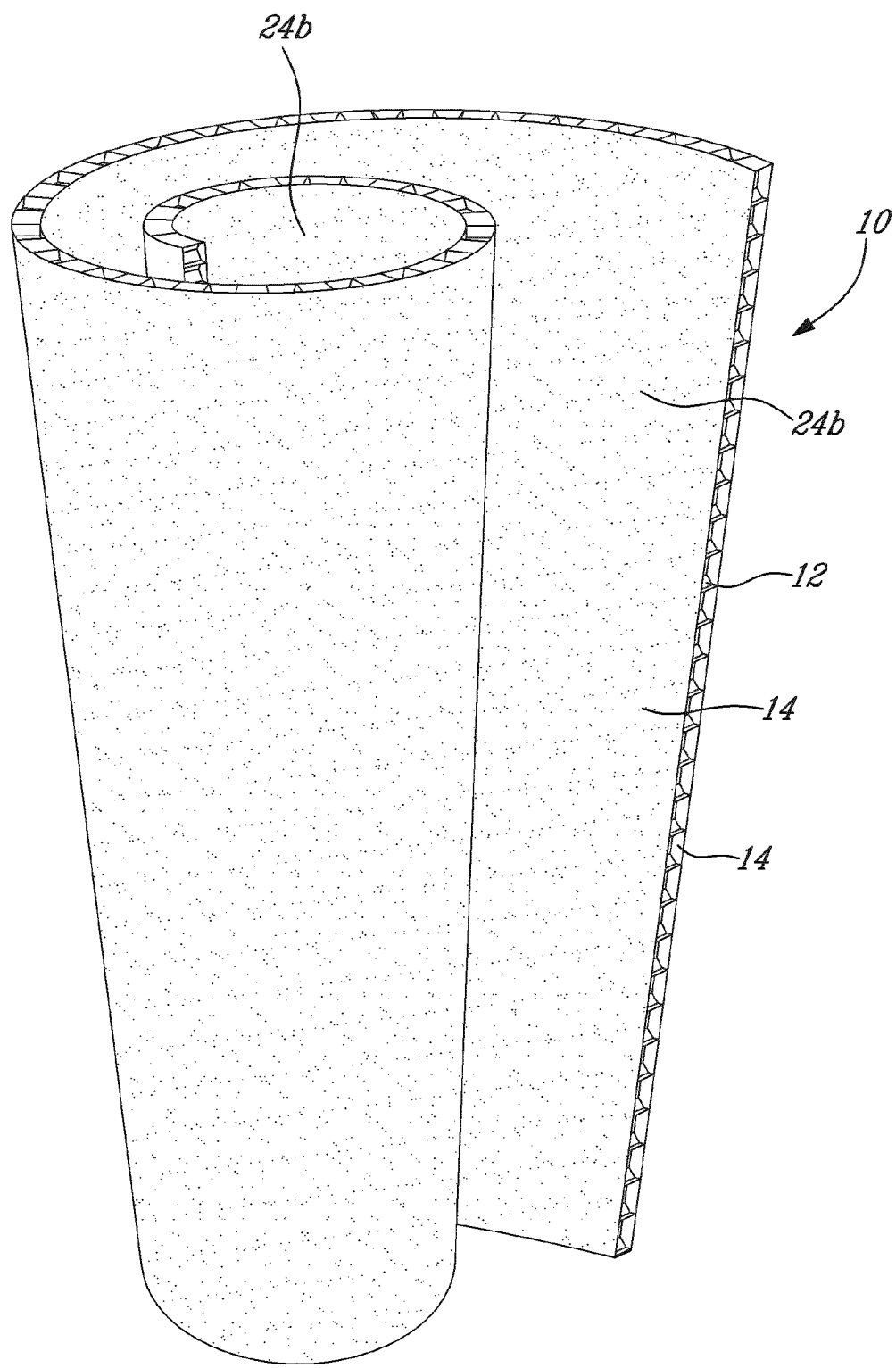
FIG. 2 is a perspective view of the material shown in FIG. 1 rolled into a spiral-like shape.
Figure 3:
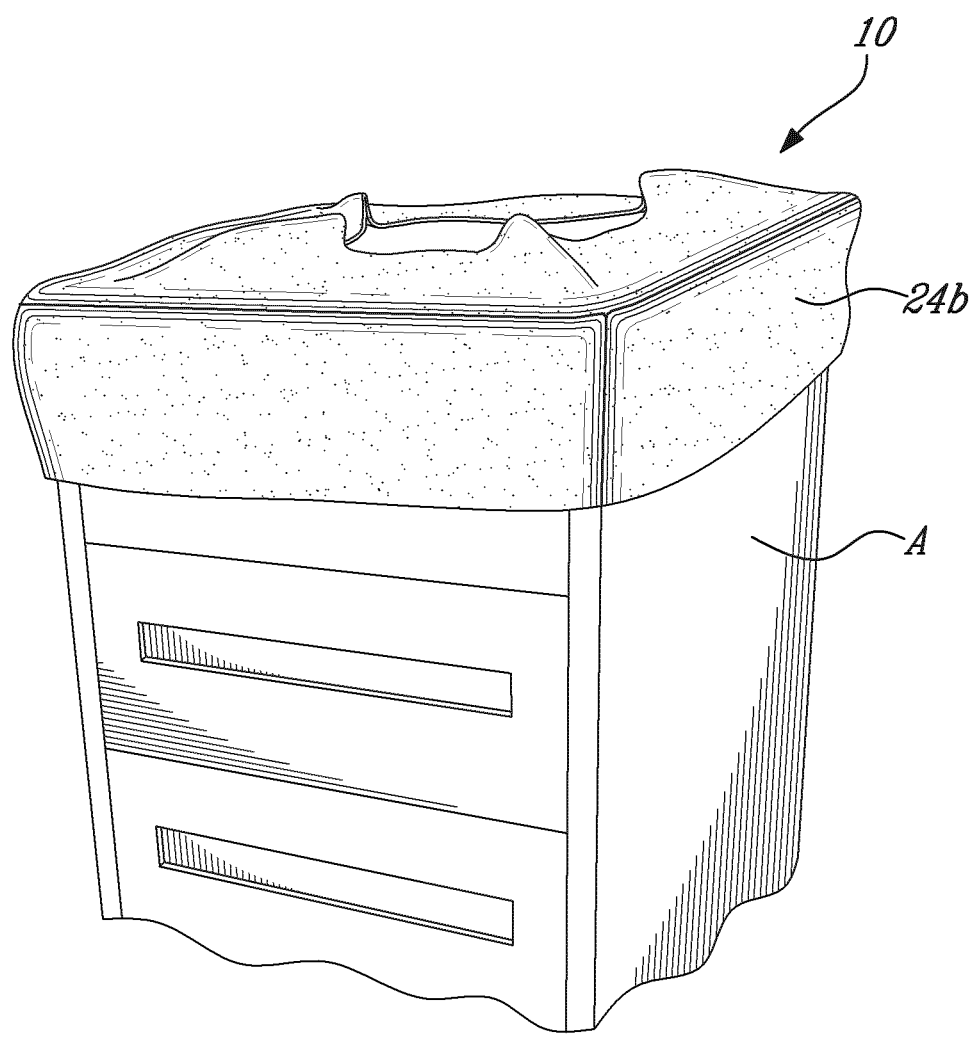
FIG. 3 is a perspective and schematic view of the material shown in FIG. 1 applied over an upper portion of an object and folded along several axes.
Figure 4:
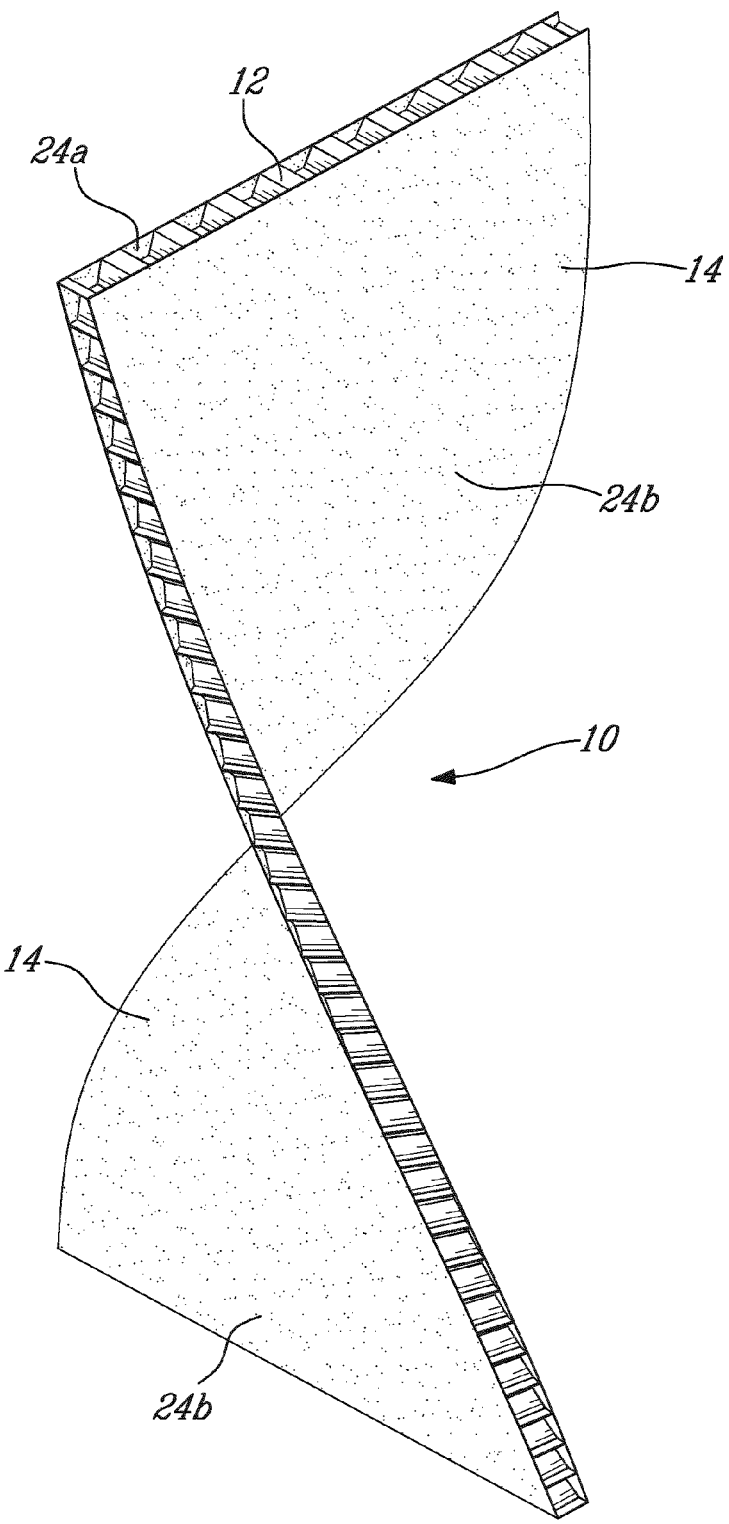
FIG. 4 is a perspective view of the material shown in FIG. 1, partially twisted.

The resulting material 10 is flexible along a plane defined by the liners 14, i.e. it can be folded along substantially any axis parallel to the liners 14 or allows folding substantially in all planar directions as shown in FIGS. 2 to 4. Thus, the material 10 can adapt and substantially conform to the shape of an object being wrapped or protected or to a void space being filled. In FIG. 3, the material 10 is applied to the upper portion of an object and, more particularly, a filing cabinet A. The material 10 is folded along several non parallel axis. The material 10 has protective and cushioning properties particularly when stresses are applied in a direction substantially perpendicular to the liners 14.

The material 10 can be either manufactured manually or continuously on any appropriate apparatus (not shown). The material 10 can be cut manually or automatically to the desired size.

The material 10 can be used for packaging and void space filling applications to replace bubble wrap or any other flexible products. The material 10 is foldable and bendable in substantially all planar directions, as needed to facilitate conforming of the material 10 to the particular object being shipped. The conformability of the material 10 as a protective packaging and void space filling product, i.e. its ability to wrap around all surfaces of an object, including corner areas of the object, provides cushioning against shock loads imposed at any angle on the outer shipping container or directly on the material. It is thus adapted for use in packaging, specifically in multi planar, pliable packaging and void space filling applications.

The cellulosic or paper-based materials for the walls 16 or the liners 14 can be impregnated and/or coated with a resin to improve their resistance to water, grease or fire, their gas and vapor barrier properties, their non-slip properties, their low-abrasion properties, their low friction properties, and the like. They can also be treated with a water-based coating or a resin coating. For instance and without being limitative, the cellulosic or paper-based materials for the walls 16 or the liners 14 can include up to 45% of a non-cellulosic material such as resins, polymers, and the like.

Several adhesives can be used to laminate the face members 14 to the core portion 12. For example, without being limitative, adhesives such as water-based adhesive, polyvinyl alcohol (PVOH), polyvinyl acetate (PVA), acrylic, stamp glue, dextrin, and polyurethane can be used to assemble components of the composite material together. Hot melt adhesives such as polyolefin and ethylene vinyl acetate (EVA) can also be used. In some embodiments, it might be desirable to use a degradable or a repulpable adhesive. In other embodiments, it might be desirable to use an adhesive that remains on the surfaces 20 of the geometrically patterned structure of the core portion or an adhesive that bonds very rapidly.

Pressure-sensitive and/or cohesive adhesives can be applied on an outer surface of the face members or liners 14, i.e. the surface in contact with the article to be wrapped. The pressure-sensitive adhesives can be activated by applying pressure. The material 10 can be removably bonded to the article to be wrapped during the wrapping process.

Furthermore, release adhesives or any other appropriate adhesives can be applied to the liners 14 and, more particularly to their outer surfaces 24b.

Polycoating can also be applied to the liners 14 and, more particularly to their outer surfaces 24b to modify the properties of the liners 14. For instance, a polycoating can be applied to increase the abrasion resistance of the liners 14.

One skilled in the art will appreciate that the grammage of the liners including the resins, the adhesives, the coatings, or any other products is lower than about 120 grams per square meter. In an alternative embodiment, the grammage of the liners is below about 80 grams per square meter.

In an embodiment, the material 10 can be substantially continuous. It can be substantially free of continuous or discontinuous cuts extending through the core portion 12 and/or the liners 14. In an alternative embodiment, the material 10 can include cookie cuts extending solely through at least one of the liners 14, slit cuts extending through one of the liners 14 and at least partially in the core portion 12, or other cuts that increase the flexibility of the structure 10 and facilitate its forming. The cuts, such as slits or grooves, orientate the flexibility of the material along predetermined axes.

The material 10 can be used to wrap irregularly shaped products.

The material 10 can be transported, stored, and sold as a roll wherein the material 10 is rolled onto itself in a spiral shape.

The material 10 can be folded along any axis without requiring a discontinuity, which can be continuous or not, extending through one of the liners and/or the core portion. Discontinuities include cuts defined in the material 10. The material 10 can be folded simultaneously along two axis that are not parallel to one another.

The material 10 is adequate as a flexible and protective packaging, void space filling and protective material. Moreover, it is a cost-efficient packaging and void space filling material due to its lightweight and recyclable and degradable nature.

The material 10 can also be used in structural applications such as inner filling for furniture.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A flexible cellulosic fiber-based material comprising:
a core portion having a geometrically patterned structure defining open-ended honeycomb core cells and two spaced-apart substantially planar faces and providing air space therebetween, the core portion including a stack of cellulosic fiber-based sheets having a core grammage, the sheets being bonded together at spaced-apart intervals in a staggered configuration; and
at least one cellulosic fiber-based liner bonded to a respective one of the planar faces of the core portion and having a liner grammage lower than the core grammage, the material being flexible along a plane defined by the at least one liner and rollable onto itself.

2. The cellulosic fiber-based material as claimed in claim 1, wherein the geometrically patterned structure comprises a plurality of cells having a diameter and a height, and the ratio of the cell height and the cell diameter is below 1.1.

3. The cellulosic fiber-based material as claimed in claim 1, wherein the core grammage ranges between 60 and 200 grams per square meter.

4. The cellulosic fiber-based material as claimed in claim 1, wherein the liner grammage is below 100 grams per square meter.

5. The cellulosic fiber-based material as claimed in claim 1, having an overall thickness ranging between 0.6 and 2.5 cm.

6. The cellulosic fiber-based material as claimed in claim 1, wherein the geometrically patterned structure comprises a honeycomb material with a grid of hexagonal cells having a diameter ranging between 0.6 cm and 3.8 cm.

7. The cellulosic fiber-based material as claimed in claim 1, wherein the sheets of the core portion and the at least one liner comprise wood fiber based materials.

8. The cellulosic fiber-based material as claimed in claim 1, comprising two liners, each one of the liners being bonded to a respective one of the planar faces of the core portion and being spaced-apart from each other.

9. The cellulosic fiber-based material as claimed in claim 1, wherein the at least one liner is substantially free of continuous discontinuities.

10. The cellulosic fiber-based material as claimed in claim 1, wherein the flexible cellulosic fiber-based material is rolled onto itself into a spiral shape.

11. The cellulosic fiber-based material as claimed in claim 1, wherein the ratio of the cell height and the cell diameter is below or substantially equal to 1.

12. The cellulosic fiber-based material as claimed in claim 1, wherein the liner has a cellulosic fiber grammage below 60 grams per square meter.

13. The cellulosic fiber-based material as claimed in claim 1, wherein the geometrically patterned structure comprises cells having a diameter ranging between 0.6 cm and 3.8 cm.

14. The cellulosic fiber-based material as claimed in claim 1, wherein the cellulosic fiber-based material is foldable along several non-parallel axes.

15. The cellulosic fiber-based material as claimed in claim 1, wherein the cellulosic fiber-based material is reshapable following folding.

16. The cellulosic fiber-based material as claimed in claim 1, wherein the cellulosic fiber-based material is foldable simultaneously along at least two non-parallel axes.

17. A method for packing an article comprising:
applying the flexible cellulosic fiber-based material of claim 1 over the article to at least partially cover the article; and
folding the flexible cellulosic fiber-based material over at least one non-planar element of the article.

18. The method as claimed in claim 17, comprising directly superposing one of the at least one liners to the article being packed.

19. An article at least partially protected by the flexible cellulosic fiber-based material of claim 1.

20. The article as claimed in claim 19, wherein the material is folded over at least one non-planar element.

* * * * *